D. B. BLAISDELL.
TRACTOR.
APPLICATION FILED JAN. 10, 1914.
1,117,966.
Patented Nov. 24, 1914.
2 SHEETS—SHEET 1.
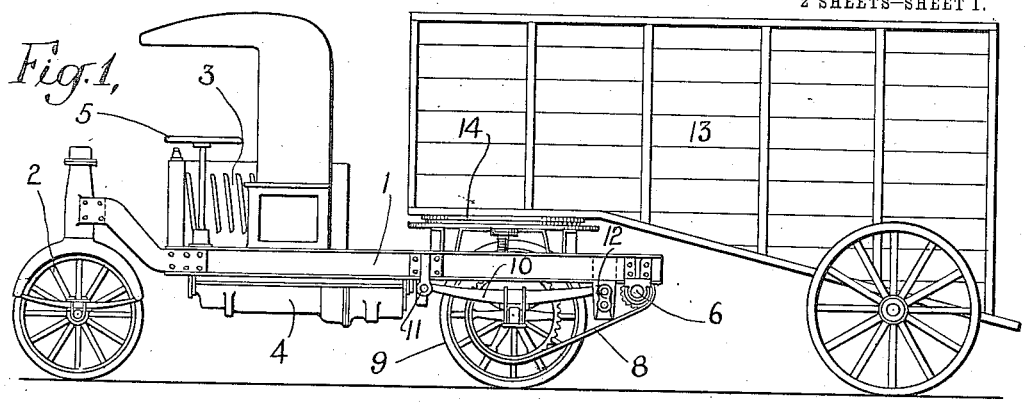
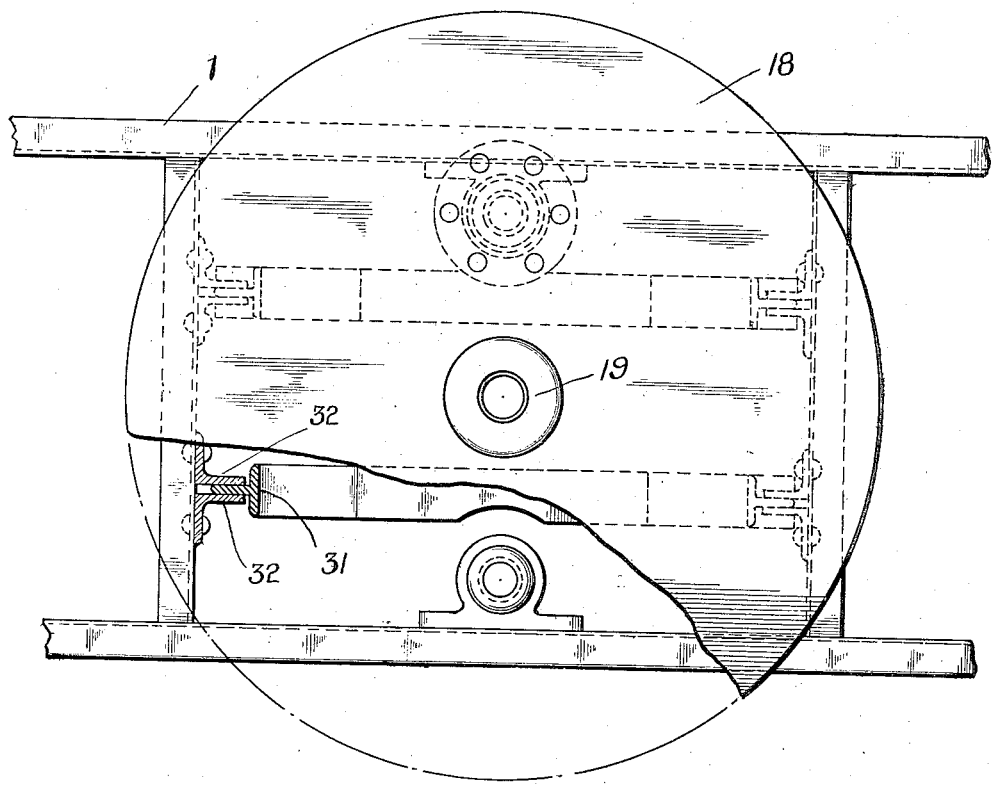
WITNESSES
INVENTOR
David Bruce Blaisdell
BY
Pennie Davis & Goldsborough
ATTORNEYS

D. B. BLAISDELL.
TRACTOR.
APPLICATION FILED JAN. 10, 1914.

1,117,966.

Patented Nov. 24, 1914.
2 SHEETS—SHEET 2.

WITNESSES

INVENTOR
David Bruce Blaisdell
BY
Pennie Davis & Goldsborough
ATTORNEYS

UNITED STATES PATENT OFFICE.

DAVID BRUCE BLAISDELL, OF BROOKLYN, NEW YORK.

TRACTOR.

1,117,966. Specification of Letters Patent. Patented Nov. 24, 1914.

Application filed January 10, 1914. Serial No. 811,440.

*To all whom it may concern:*

Be it known that I, DAVID BRUCE BLAISDELL, a citizen of the United States, residing in the borough of Brooklyn, county of Kings, State of New York, have invented certain new and useful Improvements in Tractors; and I do hereby declare the following to be a full, clear, and exact description of the invention, such as will enable others skilled in the art to which it appertains to make and use the same.

The present invention relates to tractors of a type suitable for use in hauling heavy loads; and more particularly is directed to certain features of construction whereby an improved connection is established and maintained between the frame of the tractor and the frame of the trailing vehicle.

It is an object of the present invention to provide such a connection between the tractor and the trailer that ordinary coal wagons or the like can be used as trailers and can be used interchangeably and need no particular adjustment or alteration in preparation for connection with the tractor other than that of removal of the front axle and other parts up to the fifth wheel or turntable with which wagons are ordinarily provided.

Coal wagons vary in height and it is an object of this invention to provide a support for the fifth wheel of the wagon which shall be adjustable with respect to the tractor frame so that by its vertical movement preliminary to coupling up with the trailer the front end of the trailer can be kept at its proper elevation above the roadway.

To accomplish these and other objects, which will hereinafter appear, the tractor is provided with a fifth wheel preferably in the form of a flat circular plate and mounted on jacks whereby it may be raised or lowered. This flat plate will receive and support wagon fifth wheels of different diameters and will give proper support to the front end of the trailing vehicle. Anchoring means for the fifth wheel of the trailer is provided and the parts are so arranged that the tractor fifth wheel may rock with respect to the tractor frame, thereby giving a certain flexibility to the connection between the tractor frame and the trailing vehicle.

For a better understanding of the present invention, reference may be had to the following detailed description, which is to be taken in conjunction with the accompanying drawings, wherein—

Figure 3:
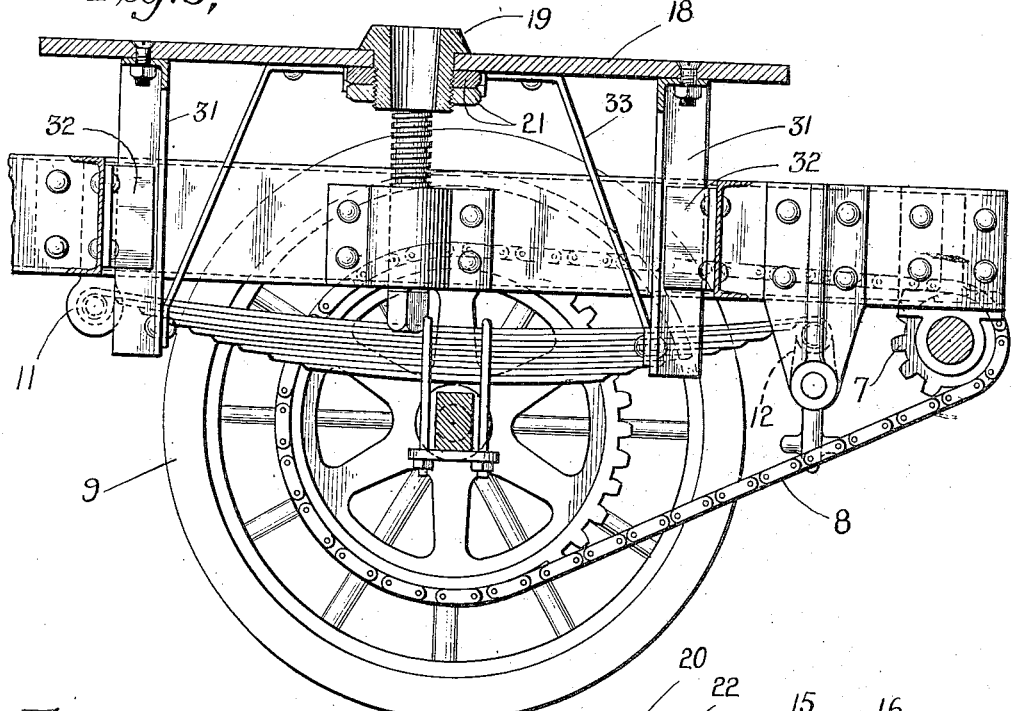
Figure 4:
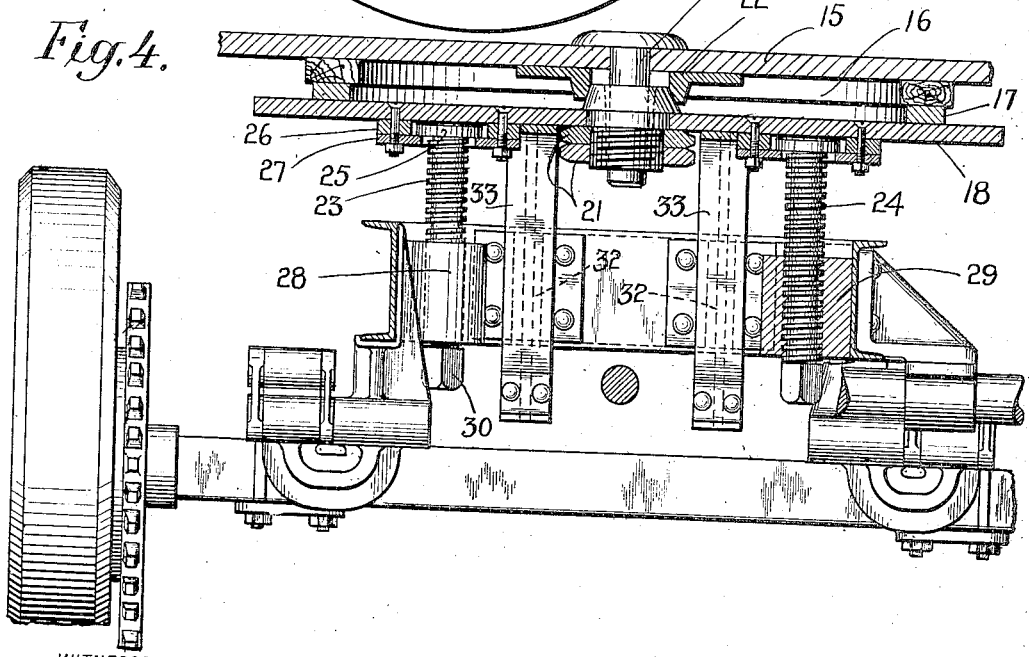

Figure 1 is a side elevation of a tractor coupled to its trailer, which in this instance is a coal wagon. Fig. 2 is a plan view of the tractor fifth wheel partly broken away to show one of the jack sockets and one of the anchoring braces. Fig. 3 is a longitudinal section through the tractor frame along the central line of the tractor fifth wheel. Fig. 4 is a sectional elevation transverse to that of Fig. 3 and looking toward the rear of the tractor.

The tractor of my invention comprises a frame 1 of channel iron at the front of which is mounted one or more steering wheels 2, and on which is carried an engine 3, transmission and change speed gearing 4, and a suitable steering wheel 5. The engine is operatively connected in suitable manner with a jack shaft 6, mounted at the extreme rear end of the tractor frame and bearing sprocket wheels 7 (Fig. 3) connected through sprocket chains 8 to drive the traction wheels 9 of the tractor. By mounting the jack shaft 6 at the extreme rear end of the tractor frame instead of in front of the traction wheels, the wheel base of the tractor is materially shortened up, and the tractor is made much easier to control and much better adapted for use with the trailer. The tractor frame 1 is supported on springs 10, the forward ends of which are connected to rigid anchors 11, and the rear ends of which are connected through swinging links 12 to suitable brackets depending from the frame of the tractor. These springs carry not only the weight of the tractor but also support the front end of the trailing vehicle.

In the particular embodiment here disclosed, the trailing vehicle 13 is a coal wagon, of ordinary type, except for the removal of its front running gear up to the plane of separation between the rigid fifth wheel 14 of the wagon and the corresponding fifth wheel of the front axle.

Referring to Fig. 4, there is shown at 15 the floor of the wagon box of the trailer, and below this, somewhat diagrammatically represented at 16, is the support for the wagon fifth wheel 17. This wagon fifth wheel is the one normally on the wagon and of course varies in diameter with the type and style of wagon. The fifth wheel 18 of the tractor is in the form of a heavy circular metal plate with a hole in its center for the reception of a socket 19, through which the king bolt 20 of the trailer may be introduced. Preferably this socket is secured in place by suitable nuts 21. Except for socket 19, which is shaped to receive the corresponding socket 22, with which wagons are usually provided, the entire top face of the tractor fifth wheel 18 is a smooth, level surface, adapted to give support to wagon fifth wheels of any ordinary diameter, and without regard to variations in detail. The tractor fifth wheel 18 is supported on a pair of threaded posts or jacks 23 and 24, and the connection between each jack and the plate includes a disk 25, the top face of which is rounded to limit the area of contact with the tractor fifth wheel 18, and the center of which is bored out to receive the cylindrical and reduced upper end of the jack. With this arrangement, the jack can turn with respect to its disk and the tractor fifth wheel can rock on the rounded top face of each disk 25. The disks 25 are each inclosed in a housing comprising a ring 26, and a cover plate 27, held in position by suitable bolts or rivets. The jacks 23 and 24 are threaded respectively into the sockets 28 and 29, each of which is rigidly secured by rivets, or the like, to one of the side channel beams of the tractor frame, and each jack may be provided at its lower end with a wrench seat 30 whereby it may be turned in its socket to raise or lower the tractor fifth wheel.

As a means for steadying the tractor fifth wheel and relieving its jacks of some of the strain, anchoring means are provided comprising four vertical bars 31 rigidly attached to the tractor fifth wheel, and each T-shaped in cross-section. Each of its bars is movable freely up and down between a pair of lugs 32 (Fig. 2), and is held by these lugs against lateral movement. The lower end of each vertical T-bar is connected with a diagonal brace 33 which extends upwardly into contact with the lower face of the fifth wheel, where it is riveted, and then crosses over and down to connect with the opposite T-bar. The parts are so adjusted that there may be a slight rocking movement of the fifth wheel on the tops of the jacks before the vertical T-bars 31 strike the ends of lugs 32, and this is of advantage on rough roads in that it allows the tractor frame to swing in a vertical plane with respect to the trailing vehicle. No great degree of swinging movement is necessary or in my opinion desirable, and after the fifth wheel has rocked through a small angle the supports 31 strike and limit further swinging on the jacks. Of course the tractor frame is entirely free to swing in a horizontal plane at all times and can swing so far around that the entire equipment is capable of turning in a relatively narrow street.

When the tractor is in action with the weight of the front end of the trailer resting on the tractor fifth wheel, the push and pull of the loaded trailer is taken not so much by the jacks 23 and 24 as by the anchoring bars 31, for the disks 25 with which the jacks are equipped are capable of slight movement in their retaining boxes, and the fifth wheel 18 is therefore capable of a slight forward or backward movement with respect to the tractor frame. As a result any sudden shock of jar delivered by the trailer is borne by the T-bars 31 and their braces 33, and need not be borne directly by the jacks 23 and 24. For instance, in starting, the tractor fifth wheel will shift rearwardly until the vertical bars 31 strike the edges of lugs 32, and thereby transmit to a cross-member of the tractor frame the backward pull of the loaded trailer.

The king bolt 20, whereby connection is established between the trailer and the tractor fifth wheel, may be the usual wagon king bolt, and to disconnect a trailer and substitute another it is only necessary to withdraw the king bolt and hold up the front end of the trailer while the tractor is run out from under. The trailers may be ordinary coal wagons such as are in common use, and the interchange of one trailer for another can be made very quickly and without any mechanical changes in the parts utilized other than a vertical shifting of the tractor fifth wheel by means of its jackets 23 and 24.

I claim:

1. The combination of a tractor frame, a pair of jacks carried on said frame, a flat plate mounted to rock on said jacks and anchoring means operatively connecting said plate with said frame to protect said jacks from the thrust of the trailer.

2. The combination of a tractor frame, a pair of jacks carried on said frame, a flat plate mounted on said jacks and movable transversely thereof a small distance, and vertical anchor bars connected to said plate and slidingly mounted in said frame to protect said jacks from the thrust of the trailer.

3. In a tractor, the combination of tractor wheels, a frame carried thereby on springs, sockets rigidly mounted on said frame, a pair of jacks threaded in said sockets, a flat plate mounted on said jacks and vertical anchor bars connected to said plate and slidingly mounted in said frame to protect said jacks from the thrust of the trailer.

4. In a tractor, the combination of tractor wheels, a frame carried thereby on springs, a pair of jacks carried on said frame, a flat plate mounted on said jacks, and vertical anchor bars connected to said plate and slidingly mounted in said frame to protect said jacks from the thrust of the trailer.

5. The combination of a tractor frame, a fifth wheel carried thereby and consisting of a plate flat on top to accommodate wagon fifth wheels of different diameters, means for raising or lowering said fifth wheel to suit the height of the trailer to be hauled, and anchoring means connected with said plate and slidingly mounted in said frame to protect said raising or lowering means from the thrust of the trailer.

6. The combination of a tractor frame, a pair of jacks carried by said frame, a fifth wheel mounted on said jacks and adapted to rock thereon and slide thereover, and means for operatively connecting said plate with said frame to limit the rocking and sliding movements of said plate on said jacks.

7. The combination of a tractor frame, a fifth wheel for connecting with a trailing vehicle, jacks adjustably supporting said fifth wheel above said frame, rounded caps interposed between said jacks and said fifth wheel, and permitting said fifth wheel to rock on the jacks and anchor means coöperating with the tractor frame to limit said swinging movement.

8. The combination of a tractor frame, a pair of jacks carried thereby, rounded caps for said jacks, a circular plate resting on said caps and adapted to support trailer fifth wheels of different diameters, and vertical anchor bars rigidly connected with said plate and slidingly connected with said frame to limit the rocking movement of said plate on its jacks and to protect the jacks from the push and pull of the trailer.

9. The combination of a rigid tractor frame, sockets rigidly attached thereto, a jack threaded in each socket, rigid cross members for said frame, lugs thereon forming guideways, a circular plate supported by said jacks and capable of slight movement transversely thereof, and anchoring means for said plate comprising a plurality of vertical bars rigidly attached to the plate and movable up and down in the guideways of said cross members, said vertical bars permitting slight rocking and transverse movements of the plate on the jacks but limiting these movements to protect the jacks from the push and pull of the trailer.

10. The combination of a rigid tractor frame, sockets attached thereto, a jack threaded in each socket, rigid cross members for said frame, lugs thereon forming guideways, rounded caps for said jacks, a circular plate mounted to rock on said caps and capable of slight movement transversely of said jacks, and anchoring means for said plate comprising vertical bars rigidly attached thereto and movable up and down in said guideways, said vertical bars limiting the movements of said plate on its jacks and protecting the jacks from the thrust of the trailer.

In testimony whereof I affix my signature, in presence of two witnesses.

DAVID BRUCE BLAISDELL.

Witnesses:
W. C. LUNSFORD,
ARBA B. MARVIN.